United States Patent [19]

Sweetin

[11] Patent Number: 4,589,670
[45] Date of Patent: May 20, 1986

[54] CONVERTIBLE TRUCK/TRAILER ASSEMBLY AND METHOD

[76] Inventor: Willard L. Sweetin, 5956 Fazon Rd., Bellingham, Wash. 98226

[21] Appl. No.: 503,704

[22] Filed: Jun. 10, 1983

[51] Int. Cl.⁴ .................... B60P 1/28; B62D 53/04
[52] U.S. Cl. ............................ 280/405 R; 280/418; 280/423 A; 280/490 R; 280/477; 414/483
[58] Field of Search ............ 280/405 R, 405 A, 475, 280/477, 483, 490 R, 402, 474, 423 A, 418; 414/483

[56] References Cited

U.S. PATENT DOCUMENTS

| | | | |
|---|---|---|---|
| 1,887,118 | 11/1932 | Collinge | 280/418 |
| 2,126,819 | 8/1938 | Schwalem | 280/423 A |
| 2,227,762 | 1/1941 | Ronning | 267/58 |
| 2,327,308 | 8/1943 | Johnston | 280/490 |
| 2,328,343 | 8/1943 | Jacob | 280/490 R |
| 2,590,210 | 3/1952 | Rogers | 280/477 |
| 2,599,993 | 6/1952 | Hill et al. | 280/474 |
| 2,628,126 | 2/1952 | Black | 280/475 |
| 2,823,817 | 2/1958 | Holsclaw | 414/483 |
| 2,832,486 | 4/1958 | Clark | 414/483 |
| 2,995,399 | 8/1961 | Riseborough | 414/483 |
| 3,004,772 | 10/1961 | Bohlen | 280/405 A |
| 3,043,459 | 7/1962 | Whalen | 414/483 |
| 3,101,854 | 8/1963 | Kampert | 280/477 |
| 3,101,958 | 8/1963 | Gerou | 280/423 |
| 3,201,144 | 8/1965 | Smyser | 280/477 |
| 3,233,766 | 2/1966 | Clausen | 414/483 |
| 3,381,974 | 5/1968 | Carter, Jr. et al. | 280/405 A |
| 3,420,390 | 1/1969 | Taggart | 414/339 |
| 3,421,778 | 1/1969 | Barker et al. | 280/475 |
| 3,450,281 | 6/1969 | Groberg | 414/483 |
| 3,472,406 | 10/1969 | Slipp | 414/483 |
| 3,536,338 | 10/1970 | Stueven | 280/402 |
| 3,539,066 | 11/1970 | Stevenson | 414/483 |
| 3,602,384 | 8/1971 | Warren | 414/483 |
| 3,690,491 | 9/1972 | Butler, Jr. | 414/483 |
| 3,693,818 | 9/1972 | Teagarden | 414/483 |
| 3,717,363 | 2/1973 | Berends | 280/476 |
| 3,751,060 | 8/1973 | Holmberg | 280/402 |
| 3,796,328 | 3/1974 | Kragness | 280/402 |
| 3,802,716 | 4/1974 | Wiers | 280/405 A |
| 3,901,398 | 8/1975 | Bunch | 414/483 |
| 4,047,733 | 9/1977 | Parkes | 280/402 |
| 4,081,090 | 3/1978 | Hopkins | 280/402 |
| 4,113,272 | 9/1978 | Sebby | 280/490 |
| 4,133,440 | 2/1979 | Heldrick, Jr. | 414/483 |

*Primary Examiner*—Richard A. Bertsch
*Attorney, Agent, or Firm*—Hughes & Cassidy

[57] ABSTRACT

A truck and trailer assembly adapted to travel over the road in a traveling mode, where the trailer is spaced a substantial distance from the truck, and also adapted to operate in a maneuvering mode where the trailer is more closely coupled to the truck, and the front steerable wheels of the trailer are raised out of ground engagement. In the various embodiments, this is accomplished by rotating the reach of the trailer relative to the trailer, so as to lift the forward wheels of the trailer from the ground. The reach is conveniently shortened by providing the reach as three telescoping members.

37 Claims, 29 Drawing Figures

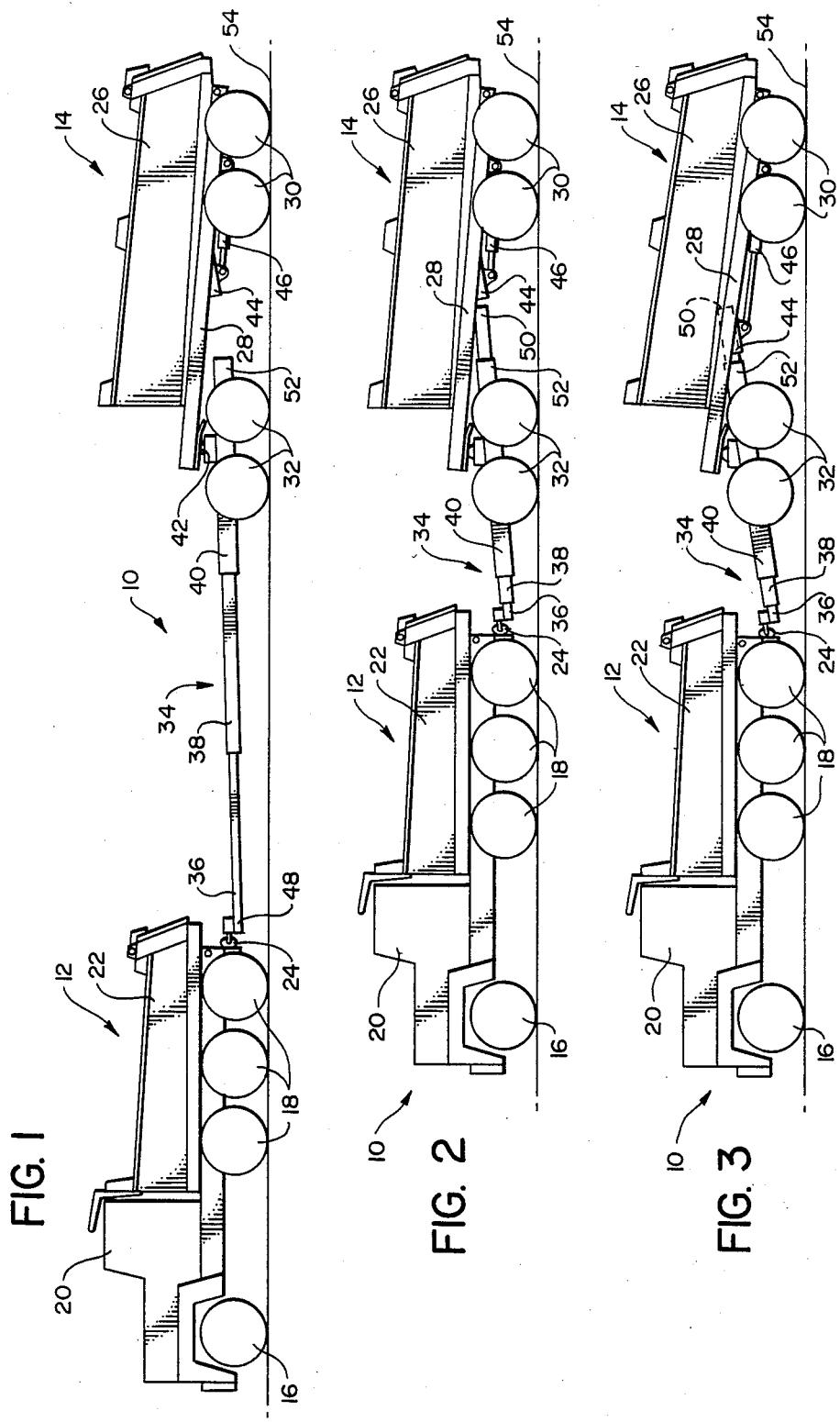

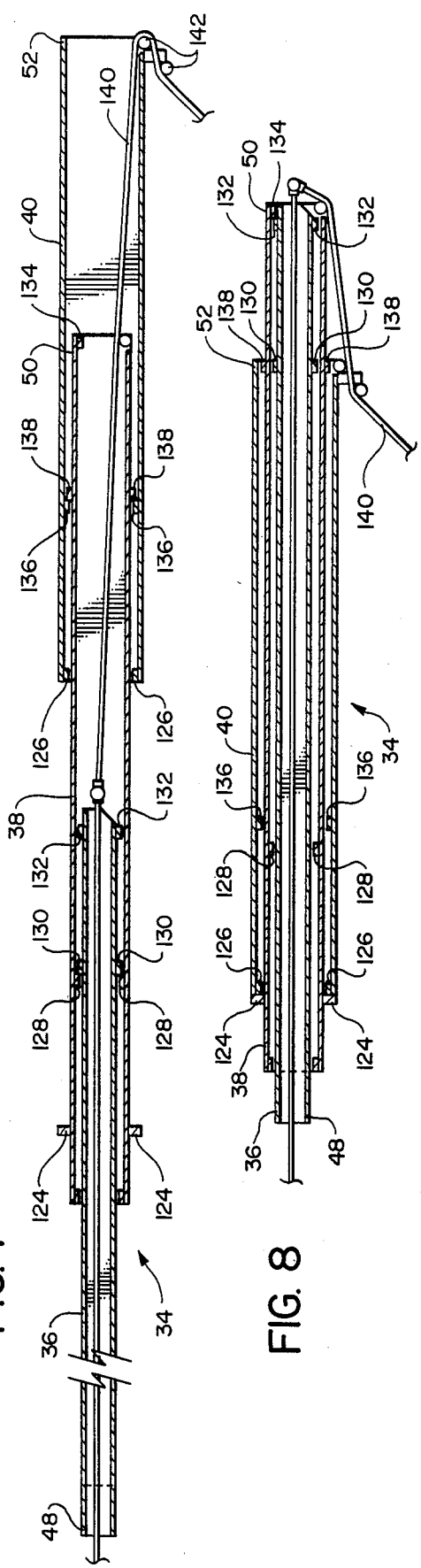
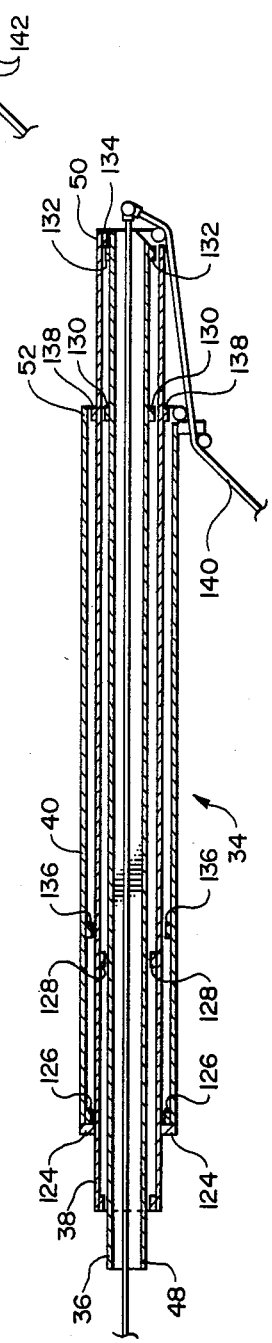
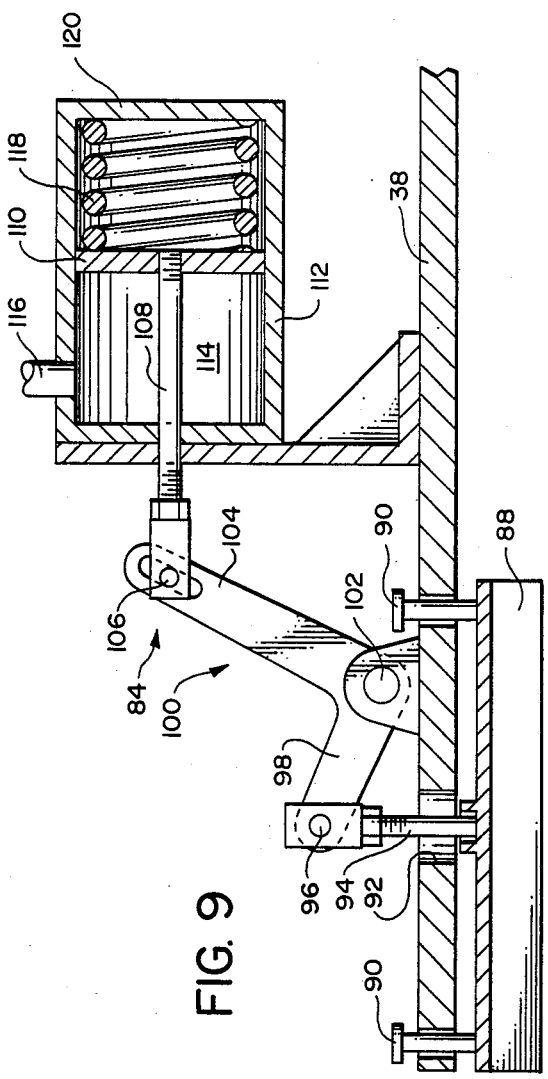
FIG. 7
FIG. 8
FIG. 9

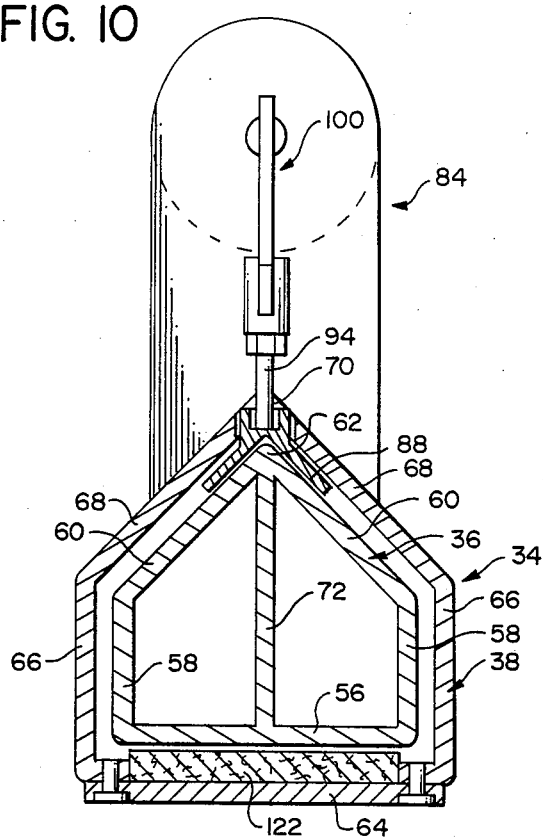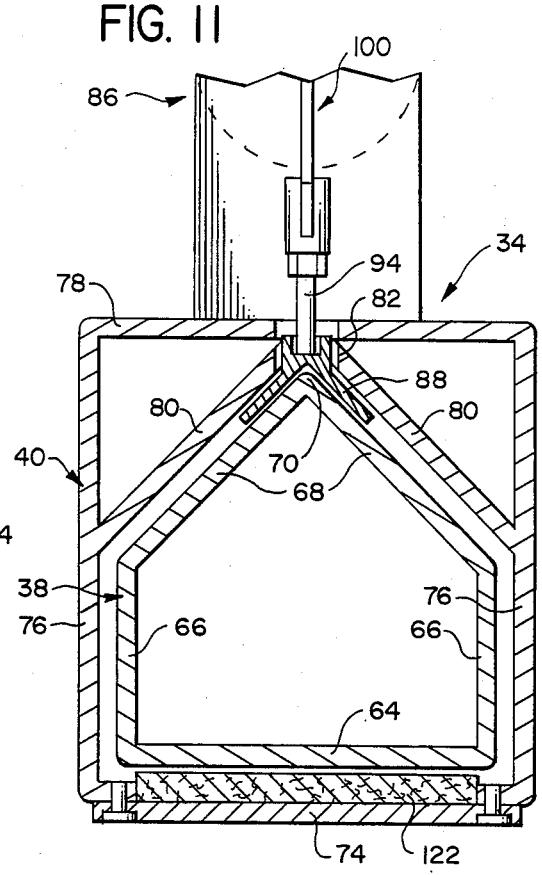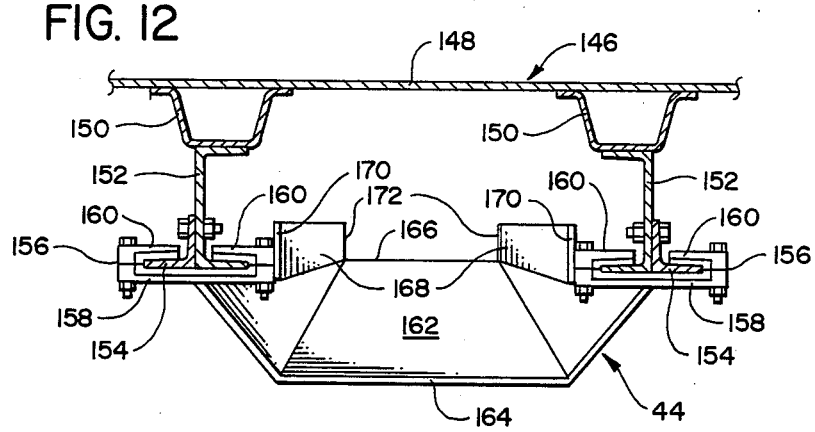

CONVERTIBLE TRUCK/TRAILER ASSEMBLY AND METHOD

BACKGROUND INFORMATION

1. Technical Field

The present invention relates to a truck/trailer assembly which is intended to operate at a high load capacity for travel over a route where there are load limitations, such as on a public highway, and also adapted to maneuver the trailer at a site, such as a loading or unloading site.

2. Background Art

When a truck and a trailer are traveling over a highway, the load limitations for the truck and the trailer depend not only on the number of axles for the ground engaging wheels which support the truck and the trailer, but also the spacing of these wheels. For this reason, it is not uncommon for a trailer to be provided with a relatively long reach or tongue by which the trailer is attached to the truck. This spaces the wheels of the trailer a sufficiently large distance from the wheels of the truck so that the total load capacity of the truck and trailer combination can be increased substantially.

As a general rule, for a truck and trailer combination, the addition of another axle to the truck or trailer generally increases the load capacity by about 1500 to 2000 pounds per axle. Also, if the trailer can be spaced rearwardly of the truck a further distance, there is an increase in load limit that is equivalent to about 1500 to 2000 pounds for each foot that the trailer can be spaced further rearwardly from the truck or tractor.

In one general arrangement, the trailer has a forward and a rear set of wheels, with the rear wheels being mounted to the base frame of the trailer and the forward wheels being mounted to the reach. Thus, the front wheels are steerable, in that when the truck is executing a turn, thus causing the reach to swing laterally to an angle relative to the trailer, the front wheels of the trailer turn with the reach so as to cause the trailer to properly follow the truck as it is executing a turn. While this arrangement makes it possible for the trailer to be positioned at a more rearward location relative to the truck for rather effective over the road travel, it also makes it extremely difficult to manipulate the trailer in any backup maneuver for more than a very short distance. For example, if the trailer is to function as a dump trailer which must be backed up to a particular location to discharge its load, it would generally be necessary to use a semi-trailer which has only one set of wheels on one axle or on two closely spaced axles, with the forward end of the trailer being supported by the truck. Accordingly, the trailer having the rather elongate reach with the steerable set of front wheels is generally used under circumstances where the load can be discharged in a manner that does not require backing up of the trailer.

In view or the foregoing, it is an object of the present invention to provide a novel trailer and also a truck and trailer assembly which is able to travel effectively in a traveling mode where the trailer is spaced further rearwardly ot the truck, with the trailer having a front set of steerable wheels and a rear set of wheels engaging the road surface, and also to be able to operate in a backup mode where the trailer is positioned more closely to the truck with only the rear set of wheels engaging the ground.

It is a further object of the present invention to provide effective arrangements for the mechanism to move the forward trailer steering wneels from the ground and secure the reach to the trailer for the maneuvering mode of operation.

Other objects of the present invention will become apparent from the following disclosure of the invention and the description of the preferred embodiments.

SUMMARY OF THE INVENTION

The truck and trailer combination of the present invention has a travel configuration where it is adapted to travel over routes where there are limitations as to the weight which can be carried by ground engaging wheels of the combination. It also has a maneuvering configuration where it is adapted to perform maneuvers, such as backup maneuvers, effectively.

The present invention also comprises a trailer, as an inventive entity, which is adapted to be used in the present invention with a conventional truck.

In the present invention, the trailer has a front end and a rear end. It has a rear set of ground engaging wheels, and also a front set of steerable ground engaging wheels. There is an adjustable reach having a front connecting portion adapted to engage the hitch and a rear portion connected to the trailer. The reach has an extended position where the trailer is spaced further from the truck at a sufficient distance to meet route weight limitations when in its traveling configuration, and a retracted position where the trailer is positioned more closely to the truck.

Further, there is a lifting and securing means operatively connected to the trailer to raise the forward set of wheels from a ground engaging position and to secure the reach in its retracted position to the trailer in a manner to resist downward rotation of the front end of the trailer relative to the reach so as to keep the front set of wheels out of ground engagement, thus placing the combination in its maneuvering configuration.

Thus, the truck and trailer combination in its traveling configuration can carry relatively high loads, and can be arranged to be in its maneuvering configuration to accomplish more difficult maneuvers, such as backup maneuvers.

The reach is attached to the trailer at a trailer connecting location. The reach has a bearing portion at a bearing location spaced in the connecting location. The lifting and securing means comprises a lifting device to engage the reach at the bearing portion to rotate the reach relative to the trailer so that a force couple is applied at the bearing location and at said connecting location to raise the front wheels of the trailer.

In one embodiment, the bearing portion is located on the reach rearwardly of the connecting portion, and the lifting device comprises a wedging member to engage the bearing portion of the reach in wedging relationship so as to rotate the reach relative to the trailer. In a further specific configuration, the wedging member is movably mounted relative to the trailer, and there is power means to move the wedging member into wedging engagement with the bearing portion. The specific configuration of the wedging member is desirably made so that there are wall means defining a rearwardly tapering recess to receive a bearing portion at the rear end of the reach. Thus, as the wedging member comes into wedging engagement with the reach, the reach becomes centered relative to the tapering recess, so as to properly locate the reach relative to the trailer.

In another arrangement, the wedging member is positioned at a stationary location relative to the trailer. The reach has a telescoping member movable rearwardly into wedging engagement with the wedging member, whereby rearward movement of the reach into wedging engagement raises the front set of trailer wheels out of ground engagement.

In another arrangement, the lifting device comprises a generally horizontally aligned pivot arm having a pivot location spaced from the bearing location on the reach. The combination further comprises power means to rotate the lever upwardly to apply an upward force to the bearing portion. As a modification, the lever can have a pivot location vertically above the bearing portion.

In yet another arrangement, the trailer has a forward extension positioned forwardly of the connecting location, and the bearing portion of the reach is positioned forwardly of the connecting location. This arrangement comprises power means arranged to exert a force component of the force couple between the forward extension of the trailer and the bearing portion of the reach so as to lift the front trailer wheels. This arrangement can also have a securing device to engage the reach portion at a location rearwardly of the connecting location and hold the reach in place relative to the trailer, after the power means has raised the front trailer wheels from a ground engaging location. More particularly, the power means can comprise wedging means to engage the forward extension of the bearing portion in wedging relationship so as to move the forward extension and said bearing portion away from one another so as to lift the front trailer wheels from the ground. In another arrangement, the power means comprises an extendable power member adapted to engage the forward extension and the bearing portion to apply an extending force thereto.

In a further configuration, the trailer has a base frame and a body portion vertically movable relative to the base frame. The lifting device is arranged to be operatively connected between the reach bearing portion and the trailer body. The trailer further has a body raising means which, in raising said trailer, rotates the reach relative to the trailer base frame to raise the front wheels from the ground. In one arrangement, the lifting device comprises a harness operatively connected between the trailer body and the reach. In another arrangement it comprises a cord and pulley means operatively connected between the trailer body and the reach.

In a further configuration, the lifting and securing means comprises a lifting device operatively connected to the trailer and adapted to engage a ground surface so as to raise the trailer front wheels from a ground engaging location. Further, there is a securing device adapted to secure the reach to the trailer so as to prevent the front trailer wheels from returning to the ground. In one form, the securing means can engage the reach at a location rearwardly of the connecting location. In another arrangement, the securing means can be forward of the connecting location.

Desirably, the reach has a plurality of telescoping sections, comprising at least a forward telescoping section connected to the truck, and a rear telescoping section connected to the trailer. The reach has locking means to secure the reach in its extended and its retracted positions.

More particularly, in certain preferred embodiments, the forward telescoping section is adapted to telescope rearwardly in the rear telescoping section to extend rearwardly from the rear telescoping section. The lifting and securing means comprises a lifting device arranged to engage a rear portion of the forward section of the reach to rotate the reach relative to the trailer to raise the front wheels ot the trailer. Desirably, the reach comprises at least three telescoping sections. In a preferred configuration, the first and second telescoping sections have a cross-sectional configuration comprising upper wall means having a sloped configuration. Thus, debris failing on the reach would not remain deposited on the reach.

The present invention is particularly adapted to be embodied in a dump trailer having a brace frame and a dump body pivotally mounted at the rear end of the dump body to the base frame. The trailer further has dump body lifting means to raise the dump body between its lower position and an upper dump position. The reach is attached to the base frame at a trailer connecting location, and the reach has a bearing portion at a bearing location spaced rearwardly from the connecting location. The lifting and securing means comprises a lifting device to interconnect the bearing portion of the reach to the dump body at a location rearwardly of the pivot connection of the dump body. Thus, raising the dump body raises the bearing portion relative to the base frame so as to lift the front wheels from the ground. Desirably, the trailer has a moving member to move the connecting device into and out of engagement with the reach.

In the method of the present invention, there is provided an apparatus such as that described above. The method further comprises attaching the trailer to the truck and placing the reach in its extended position. Then the truck and trailer are moved over a route in the traveling mode with the front trailer wheels engaging a ground surface and the reach extended.

Then the truck and trailer are moved to a maneuvering location, and they are placed in the maneuvering mode by placing the reach in its retracted position and operating the lifting and securing means to lift the front trailer wheels from the ground surface.

Other specific features of the present invention will become apparent from the following detailed description.

BRIEF DESCRIPTION OF THE DRAWINGS

FIG. 1 is a side elevational view of a first embodiment of the present invention, showing the truck and trailer assembly in its traveling mode;

FIG. 2 is a view similar to FIG. 1, but showing the reach of the trailer telescoped so as to move the truck closer to the trailer in preparation for going into the maneuvering mode;

FIG. 3 is a view similar to FIG. 2, showing the truck and trailer assembly in the maneuvering mode with the front trailer wheels raised from the ground;

FIG. 7 is a sectional view taken along line 7—7 of FIG. 6 looking down on the top of the reach of the trailer of FIG. 6, with the section being taken through a horizontal plane coincident with the longitudinal center axis of the reach, with the reach being shown in its extended position;

FIG. 8 is a view similar to FIG. 7, but showing the reach telescoped back to its retracted position;

FIG. 9 is is an enlarged side elevational view of one of the two locking mechanisms for the reach, with portions of the locking mechanism being shown in section;

FIG. 10 is a sectional view of the reach taken along line 10—10 of FIG. 6;

FIG. 11 is a sectional view of the reach taken along line 11—11 of FIG. 6;

FIG. 12 is a sectional view taken along line 12—12 of FIG. 6 and showing the wedge-like lifting device of the first embodiment;

DESCRIPTION OF THE PREFERRED EMBODIMENT

Figure 5:
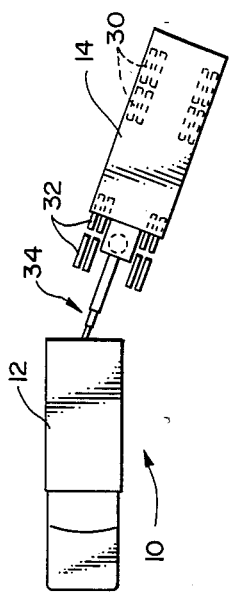
FIG. 5 is a top plan view similar to FIG. 4, showing the truck and trailer in the maneuvering mode and properly executing a backup maneuver.
Figure 4:
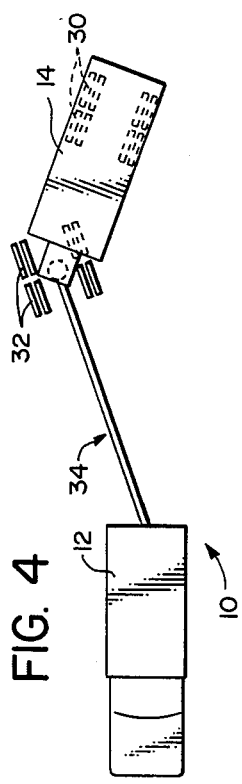
FIG. 4 is a top plan view illustrating the truck and trailer in the traveling mode, and further illustrating the difficulty of executing a backup maneuver when in this mode.

It is believed that there will be a clearer presentation of the present invention by first describing in general terms the main component of the first embodiment shown in FIGS. 1-3, and then describing the operation of this first embodiment with reference to FIGS. 4 and 5. This will be followed by a more detailed description of the first embodiment, with reference to FIGS. 6-12. Then, the other embodiments of the present invention will be described.

The truck and trailer assembly of the first embodiment illustrated in FIGS. 1-12 is generally designated 10 and comprises a truck 12 and a trailer 14 having certain novel features which enable it to cooperate rather uniquely with the truck 12 to achieve the objectives of the present invention. In this first embodiment and in most of the embodiments which are described hereinafter, the truck 12 is or may be of conventional design. However, within the broader scope of the various aspects of the present invention, one or more of the operating components that cooperate to provide the novel functions of the present invention could be incorporated in the truck or tractor that pulls the trailer 14, and one such arrangement is illustrated in a later described embodiment, shown in FIGS. 19 and 20.

To return to a description of this first embodiment, the truck 12 has a front set of steering wheels 16, and a rear set of wheels 18 which are shown herein as being mounted on three separate rear axles. There is also a cab 20 and a dump body 22 mounted for pivoting motion between its lower carrying position and its upper dump position. At the rear of the trailer is a hitch 24 which is or may be of conventional design. In the present invention, the hitch 24 and the entire truck 12 are designed so that the hitch 24 is able to take not only substantial horizontal force loads, but also relatively substantial downward force loads.

The trailer 14 comprises a trailer dump body 26 which is mounted on a main base frame 28. The dump body 26 is pivotally mounted to the frame 28 at a rear location, and is lifted by conventional hydraulic devices between its generally horizontal carrying load and its more vertically aligned dump mode. The trailer 14 has a set of rear wheels 30 mounted on two axles to the rear end of the base frame 28. Also, there is a set of front wheels 32 mounted to a tongue or reach 34.

The reach 34 is made up of three telescoping sections, namely a front section 36, a middle intermediate section 38, and a rear outer section 40. The rear outer section 40 is connected to the front end of the base frame 28 at a front pivot connection 42. This pivot connection 42 permits the reach 34 to be rotated laterally relative to the base frame 28 for turning of the trailer 14, and it also permits moderate up and down rotation of the reach 34 to accommodate irregularities in the ground surface over which the truck and trailer assembly 10 is traveling.

Mounted to the lower side of the trailer base frame 28 is a wedge-like lifting member 44, which is in turn connected to a hydraulic jack 46. The particular arrangement of the lifting member 44 will be described more particularly later herein with reference to FIG. 12, but to describe its general function, this lifting member 44 is slide mounted for fore and aft motion along the longitudinal center line of the base frame 28, with the jack 46 supplying the power to move the lifting member 44. The lifting member 44 is adapted to engage the rear end of the reach 34 in its retracted position so as to raise the rear end of the reach 34 to place the trailer 14 in its maneuvering mode.

With the main components of the truck and trailer assembly 10 being described generally in the above paragraphs, the general mode of operation of this first embodiment 10 will now be described.

In FIG. 1, the truck and trailer assembly 10 is shown in its traveling mode. The front end 48 of the front section 36 of the reach 34 is connected to the hitch 24 of the truck 12. The three reach sections 36, 38 and 40 are in their fully extended position, so that the front wheels 32 of the trailer 14 are positioned a substantial distance rearwardly of the rear wheels 18 of the truck 12. With this substantial spacing of the sets of wheels 18 and 32, the truck and trailer assembly 10 can be loaded more heavily and still be in compliance with the various governmental regulations which limit the total load which can be carried by such a truck and trailer assembly 10.

As indicated previously herein, the weight limitations depend not only upon the number of axles that carry ground engaging wheels, but also the spacing of these wheels. If the trailer 14 were positioned more closely to the truck 12, the total load which could be carried by the assembly 10 would decrease. With the assembly 10 in the traveling mode as shown in FIG. 1, the truck 12 and trailer 14 operate in generally the same manner as a conventional truck and trailer, where there is a substantially long reach attached to steerable front wheels of the trailer 14.

While such a truck and trailer assembly 10 as shown in FIG. 1 is well adapted for forward travel over highways and the like, it is not adapted to maneuver in relatively close areas, and is particularly not well adapted for any backup maneuver. In fact, as a practical matter, it is nearly impossible to perform a backup maneuver with the arrangement in FIG. 1, unless it is for only a very short distance. This is illustrated in FIG. 4, where the truck 12 is shown backing up, and with the trailer 14 skewed sideways. As the truck 12 moves rearwardly, it is possible to travel a rather moderate distance without the trailer 14 skewing. However, if any turning maneuver of the truck 12 is attempted, the reach 34 becomes angled relative to the longitudinal center axis of the trailer 14. A continued attempt to back up the truck 12 causes the trailer 14 to skew further out of alignment, as illustrated in FIG. 4. For this reason, as a matter of practical necessity, the general truck and trailer arrangement shown in FIG. 1 and also shown in FIG. 4 is generally not used where it is necessary to perform any backup maneuver greater than a very short distance.

With further reference to FIGS. 1-3, there will now be a description of how the present invention uniquely solves the problems discussed in the preceeding paragraph.

In general, in the present invention the trailer 14 is converted from the traveling mode or configuration shown in FIG. 1 to a more closely coupled semitrailer where there is only a rear set of ground engaging wheels.

To convert the trailer 14 to its maneuvering mode, first the brakes of the trailer 14 are set, and then the truck 12 is moved rearwardly to cause the three reach sections 36, 38 and 40 to telescope to a retracted position, as shown in FIG. 2. In the position of FIG. 2, the rear end of the middle section 50 extends beyond the rear end 52 of the outer rear section. The reach 34 is then locked in the position of FIG. 2, and the hydraulic jack 46 is extended to move the wedge like lifting member 44 forwardly into engagement with the rear end 50 of the middle reach section 38. This causes the reach 34 to rotate in a counterclockwise direction about the pivot connection 42, so as to rotate the front end 48 of the reach 34 to rotate downwardly relative to the trailer 14. This in turn causes the front trailer wheels 32 to lift away from the ground surface 54, as shown in FIG. 3.

With the truck and trailer assembly 10 in the position of FIG. 3, the weight of the trailer 14 is carried between the rear trailer wheels 30 and the hitch 24 of the truck 12. In this configuration, it is relatively simple for the assembly 10 to perform backup maneuvers which require turning of the trailer 14. This is illustrated in the plan view of FIG. 5, and it can be seen that the truck 10 is executing a backup maneuver while turning the trailer 14, in a rather conventional manner.

To describe the practical application of the present invention, let it be assumed that both the truck 12 and trailer 14 are to be loaded to full capacity for over the road travel so as to be within the load limits usually provided by government regulations, and let it further be assumed that the load is to be carried to a dump location where it is necessary to back into the location where the load is to be dumped. This could occur, for example, where the unloading area is a construction site and a load of gravel is to be discharged to a cement mixer.

In these circumstances, the truck and trailer assembly 10 is placed in its traveling mode, as shown in FIG. 1. With the trailer 14 being spaced a substantial distance from the truck 12, the rear truck wheels 18 are sufficiently far forward of the front trailer wheels 32 so that the truck and trailer assembly 10 is operating under a substantially higher load limit. When the truck and trailer assembly 10 reaches the construction site and moves off the highway, these same load limits no longer apply. At this time, the truck and trailer assembly 10 are moved into the maneuvering mode, in the manner described above with reference to FIGS. 2 and 3. With the trailer 14 now in its maneuvering mode of FIG. 3, the truck and trailer assembly 10 can be maneuvered in either forward travel, and more particularly in backup travel, so that the loads can be conveniently dumped at the location where the trailer 14 is backed up. The assembly 10 can then be returned to the configuration of FIG. 1 at a later time to accept another full load for highway travel.

The first embodiment of FIGS. 1-3 will now be described in more detail with reference to FIGS. 7-12. With specific reference to FIG. 10, it can be seen that the front section 36 of the reach 34 is formed as a beam having a lower horizontal wall 56, side walls 58, and two upwardly and inwardly slanting top walls 60 which slope upwardly at approximately a 45° angle to meet at an apex line 62. The middle reach section 38 has a similar cross sectional configuration, so as to have a lower wall 64, side walls 66, upper sloping walls 68, with these meeting at an apex line at 70, these components corresponding to, respectively, the components 56-62 of the inner reach section 36. Also, the inner reach 36 has a vertical longitudinally reinforcing web 72 positioned at the center of the middle reach section 38.

With reference to FIG. 11, there is shown the cross sectional configuration of the middle reach section 38 and also that of the rear outer reach section 40. The outer reach section 40 has a general box-like configuration comprising a lower wall 74, side walls 76, and a horizontal top wall 78. In addition, the reach section 40 comprises two upwardly and inwardly extending walls 80 which extend from approximately the mid height of the wall 76 to an apex location 82 at the middle of the top wall 78. Thus, the lower wall 74, lower parts of the side wall 76, and the walls 80 have an overall cross sectional configuration matching that of the intermediate reach section 38 so that the three sections 36, 38 and 40 can fit relatively snuggly within one another in telescoping relationship. Thus, the reach 34 is constructed and shaped to provide substantial strength with relatively small weight. Further, with the forward and middle sections 36 and 38 having the sloping upper walls 60 and 68, respectively, when the truck 12 is dumping material from the dump body 22 over the reach sections 36 and 38, the material does not accumulate on these reach sections 36 and 38.

So that the reach sections 36–40 can be held in either an extended or retracted position reliably (or to intermediate positions if desired), there are provided two locking mechanisms 84 and 86. Since these locking mechanisms 84 and 86 are substantially identical to one another, only the forward mechanism 84 will be described, and the numerical designations of the mechanism 84 will be applied to the corresponding components of the locking mechanism 86. As can be seen in both FIGS. 9 and 10, the locking mechanism 84 comprises a pressure plate 88 which comprises two downwardly and laterally extending side plates which engage the apex portion 62 of the inner reach 36 and the top portions of the walls 60 adjacent thereto. This pressure plate 88 is mounted by a pair of pins 90 which extend upwardly through related openings in the apex portion 70 of the intermediate reach section 38. There is a middle opening 92 formed in the apex section 70 to receive a pressure finger or pin 94. This pin 94 is in turn pivotally connected at 96 to one arm 98 of a bell crank 100, pivotally mounted at 102 to the apex line 70 of the middle section 38 at a location spaced a short distance from the opening 92. The other arm 104 of the bell crank 100 is connected through a sliding pin connection 106 to one end of a rod 108.

The rod 108 is in turn connected to a piston 110 which is mounted within a cylinder 112. The piston 110 forms with the cylinder 112 a pressure chamber 114, which is connected through an opening 116 to a source of compressed air. On the opposite side of the piston 110 there is a compression spring 118 which presses from a rear cylinder wall 120 against the piston 110 to urge it to the left, as seen in FIG. 9. When pressurized air is fed through the opening 116 into the chamber 114, it urges the piston 110 to the right against the force of the spring 118. This lifts the finger 94 upwardly to release pressure on the pressure plate 88. When the air pressure in the chamber 114 is reduced, then the compression spring 118 moves the piston 110 to rotate the bell crank 100 in a counterclockwise direction so as to force the pin 94 downwardly and urge the pressure plate 88 against the top apex portion 62 of the front reach section 36. The lower wall 64 of the middle reach section 38 has connected thereto a plate of brake material positioned directly below the pressure plate 88. When the pressure plate 88 presses the forward reach section 36 against the brake plate 122, the forward and middle reach sections 36 and 38 are immobilized relative to one another.

As indicated previously, the other locking device 86 is constructed in substantially the same manner as the locking device 84, and this is shown somewhat schematically in FIG. 11. Thus, it becomes apparent that either of the locking devices 84 and 86 can be operated independently of one another through independent air pressure lines, or both of the locking devices 84 and 86 could be operated in unison. Also, it should be noted that the locking mechanisms 84 and 86 are fail safe in that if there is a loss of air pressure, the spring 118 automatically moves the pin 94 downwardly to place the pressure plate 88 in its engaged or locking position.

Figure 6:
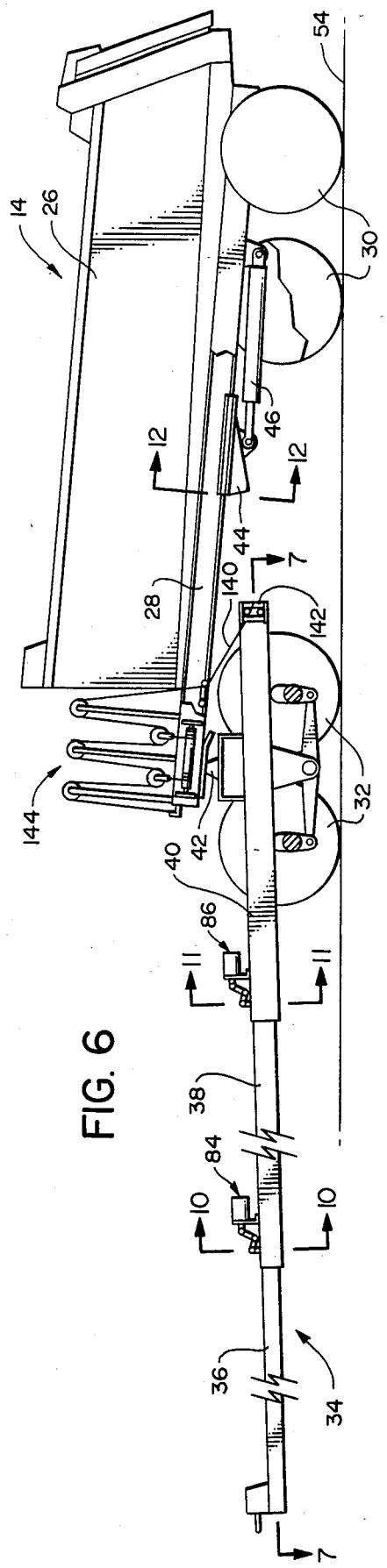
FIG. 6 is a side elevational view of only the trailer of the first, embodiment of the present invention.

The three reach sections 36, 38 and 40, are provided with suitable stop members to limit movement of the sections beyond the fully extended and fully retracted positions. As illustrated in FIG. 6 and FIG. 7, the middle section 38 is provided at its forward end with two outwardly extending stop members 124 which are adapted to engage the front edge of the rear outer reach 40 at 126. Further, the middle reach section 38 has a pair of inner stop members 128 which engage stop members 130 of the front inner reach 36 to limit forward extension of the front inner reach 36 relative to the middle reach 38. The forward inner reach 36 has additional stop members 132 which are adapted to engage a stop member 134 at the rear inner surface of the middle reach 38 to limit rearward travel of the forward inner reach 36 relative to the middle reach 38. Finally, the rear outer reach 40 has a stop member 136 adapted to engage a stop member 138 on the outer surface of the middle reach 38 to limit forward movement of the reach section 38 relative to the rear outer section 40.

The air lines and hydraulic lines which extend between the truck 12 and trailer 14 are or may be of conventional design, so these are not shown in detail herein, but only one such line is shown somewhat schematically. As shown herein, there is a line 140 which extends through the front end 48 of the forward reach section 36 and through the interior of the three sections 36, 38 and 40. At the rear end 52 of the rear outer reach section 40, a pair of guide rollers 142 are provided to lead the hydraulic line 140 outwardly from the reach section 52 without interfering with the operation of the reach 34. The slack in the hydraulic line 140 can be taken up in some suitable manner, such as is indicated by the spring loaded pulley arrangement shown at 144 in FIG. 6. Since this device 144 is or may be of conventional design, it will not be described in detail herein. Also, it is to be understood that the arrangement of the line 140, rolls 142 and slack takeup mechanism 144 are simply intended to be representative of a suitable hydraulic line system. Other systems could be used, such as a telescoping or trombone hydraulic line. Further there could be provided a multiplicity of such lines to actuate various components selectively.

The wedge-like lifting member 44 is illustrated in FIG. 12. There is a stationary mounting frame 146 which is rigidly attached to the main base frame 28 of the trailer 14. As shown herein, this frame 146 comprises a plate 148 to which are mounted two longitudinally extending hat section members 150. Attached to the lower side of the two members 150 are a pair of beams 152, each beam 152 having at the lower end thereof a pair of oppositely and laterally extending flanges 154. These flanges 154 provide a longitudinal slideway for the lifting member 44.

The lifting member 44 has right and left slide members 156, each member 156 comprising a lower plate 158 and two upper inwardly extending flanges or lips 160 which define oppositely extending troughs or slideways to receive a related slide member 156.

The lifting member itself comprises a lower plate 162 having a lower front edge 164 and a rear edge 166. This plate 162 slants upwardly from its front edge 164 to the rear edge 166. Also, there are two side plates 168, each having a forward edge 170 and a rear edge 172. These two side plates 168 slant laterally inwardly toward the rear. The lower plate 162 and the side plates 168 collectively define a rearwardly and inwardly tapering receptacle to receive the rear end 50 of the middle reach section 38. The lower plate 162 functions to raise the rear end 50 of the middle reach section 38, while the two side plates 168 center the reach section 38 so as to make it parallel to the longitudinal center line of the trailer 14.

In operation, when the lifting member 44 is in its rearward position, as shown in FIG. 1, the front edge 164 of the lower plate 162 is positioned just rearwardly of the rear edge 50 of the middle reach section 38, as shown in FIG. 2. When the hydraulic jack 46 is extended, the top surface of the lower plate 162 engages the lower rear edge of the middle reach section 38 and in a wedging action lifts the rear of the middle reach section 38 upwardly, as illustrated in FIG. 3. This causes the pivoting action of the reach 34 about the pivot connection 42 so as to lift the front trailer wheels 32 from the ground surface 54. Also, the rearward and inward slant of the walls 162 and 168 serves to locate the rear end of the reach 34 properly so as to hold it securely relative to the trailer frame 28.

Since the overall operation of this first embodiment has been described previously herein, it will not be repeated in these remarks. However, it would be helpful to describe specific features of the operation of the present invention at this time.

First, with regard to the reach 34, as illustrated in FIG. 7, with the reach 34 in its extended position, the sections 36, 38 and 40 are telescoped within one another only to a moderate extent. This is sufficient to withstand the relatively small bending moments exerted on the reach 34, since the reach 34 is primarily placed in tension as the trailer 14 is being pulled. In some instances, such as in braking, particularly when going downhill, there may be compression loads on the reach 34. The bending moments would be relatively moderate.

However, with the three reach sections 36, 38 and 40 in the retracted position as in FIG. 8, the reach 34 now acts essentially as a shorter beam to withstand relatively high bending moments. The three reach sections 36, 38 and 40, being positioned within one another, cooperate to resist these bending moments. The bending moments occur primarily from the force couple resulting by the upward force exerted by the lifting member 44 against the extreme rear end of the reach 34, and the downwardly directed force exerted by the forward end of the base frame 28 against the reach 34 at the location of the pivot connection 42. The resultant of this force couple is reacted as a downwardly directed force exerted by the front end 48 of the reach 34 on the hitch 24 of the truck 12.

In the arrangement of FIG. 3, the wedge-like lifting member 44 serves not only the function of lifting the rear of the reach 34 upwardly to raise the front trailer wheels 32 off the ground, but also functions to hold the reach 34 rigidly relative to the trailer 14 so that the trailer 14 now functions as a more closely coupled semi-trailer with only rear ground engaging wheels 30 being in touch with the ground surface 54.

As described in more detail previously herein, with the truck and trailer assembly 10 and the configuration of FIG. 1, it can travel over road surfaces and carry a rather substantial load, while still being within the load limits imposed by governmental regulation. To place the assembly 10 in its maneuvering mode, the truck 10 is backed up to the position of FIG. 2, and then the lifting member 44 is moved forwardly as illustrated in FIG. 3.

Figure 13:
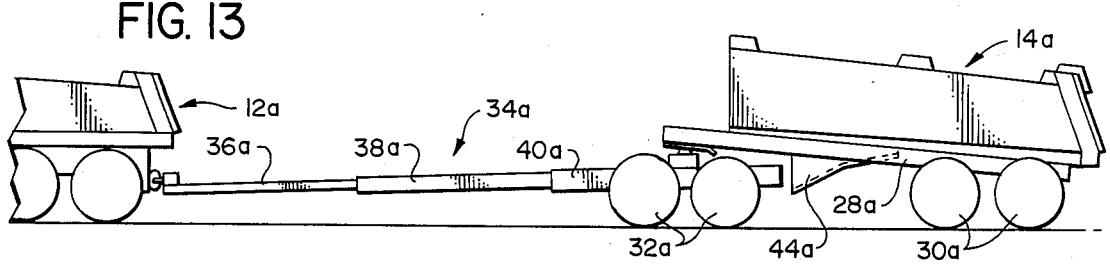
FIGS. 13 and 14 are side elevational views somewhat similar to FIGS. 1 and 3, respectively, showing a modification of the first embodiment, with FIG. 13 showing the trailer in its traveling mode and FIG. 14 showing the trailer in its maneuvering mode.
Figure 14:
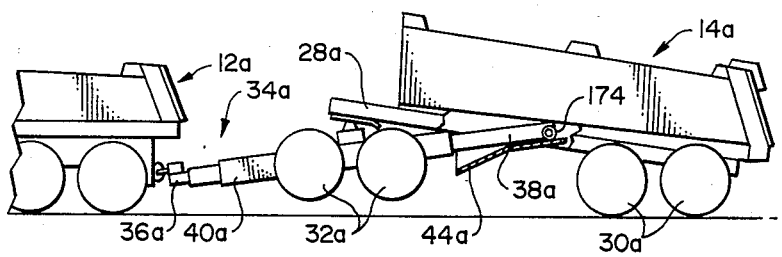

A modification of this first embodiment is illustrated somewhat schematically in FIGS. 13 and 14. Since most of the components of this modification of FIGS. 13 and 14 are quite similar to the first embodiment in FIGS. 1-12, these will be described only briefly herein. Components of the modification which are similar to corresponding components of the first embodiment will be like numerical designations, with an "a" suffixed, distinquishing those of this modification. Thus, there is a truck 12a and a trailer 14a, with the trailer 14a having rear wheels 30a and front wheels 32a, with the front wheels 32a being connected to the reach 34a. There is a lifting member 44a, but this lifting member 44a is mounted to the base frame 28a at a fixed location. When the reach 34a is retracted, as illustrated in FIG. 14, the middle reach section 38a moves further rearwardly in the rear reach section 40a so Wthat the rear end of the middle section 38a moves into wedging engagement with the lifting member 44a. As the reach 34a telescopes further rearwardly, the rear end of the reach section 38a rotates upwardly to lift the front trailer wheels 32a from the ground. To facilitate the sliding action of the reach 34a up the ramp provided by the lifting member 44a, rollers 174 can be provided at the rear end of the reach middle section 38a.

Figure 15:
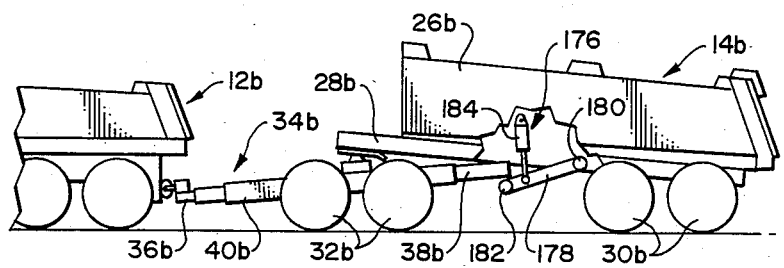
FIG. 15 is a side elevational view of yet a third embodiment of the present invention, illustrating the trailer with the reach in the retracted position and the lifting mechanism about to engage the rear end of the reach.
Figure 16:
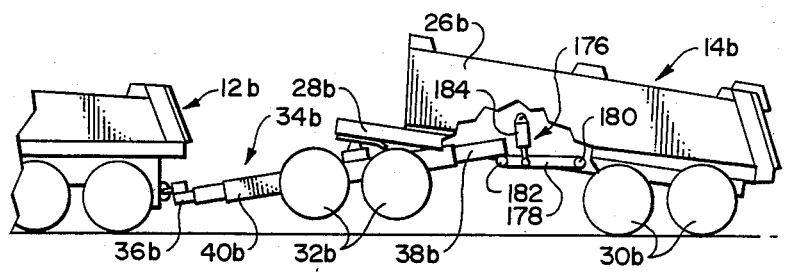
FIG. 16 is a view similar to FIG. 15, showing the trailer of the third embodiment moved to its maneuvering mode.

A second embodiment of the present invention is shown in FIGS. 15 and 16. In the description of this second embodiment, and also in subsequent embodiments, there will be no repetition of a description of the components common to most of the embodiments, such as the truck, trailer, etc. Rather, these components will be given like numerical designations corresponding to components of the first embodiment. In the description of the second embodiment, a "b" suffix will be used to distinguish the components of this second embodiment. In like manner, subsequent embodiments or modifications will be given "c" designations, "d" designations, etc.

In this second embodiment, the lifting member 44 of the first embodiment is replaced by a lifting device designated 176. This comprises a lifting lever 178 pivotally mounted to the base frame 28 at a rear location 180. The forward end 182 of the lever 178 is rotated upwardly by means of a hydraulic jack 184 connected to the dump body 26b. The forward end 182 engages the rear end of the reach 34b to lift the front wheels 32b off the ground, as illustrated in FIG. 16.

Figure 17:
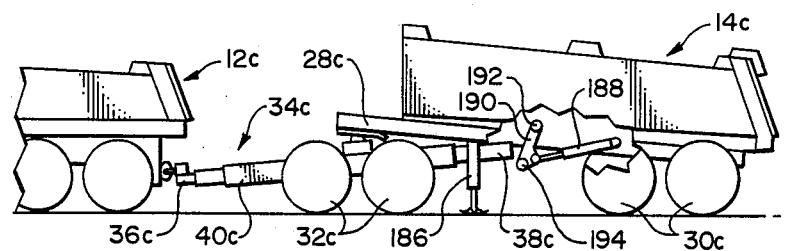
FIGS. 17 and 18 are views similar to FIGS. 15 and 16, respectively, and showing a modification of the embodiment shown in FIGS. 15 and 16.
Figure 18:
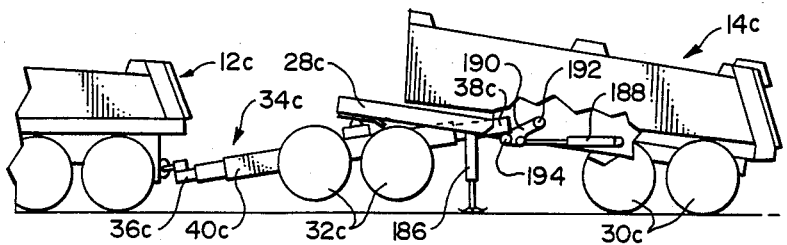

A modification of the second embodiment of FIGS. 15 and 16 is shown in FIGS. 17 and 18. In this modification of the second embodiment, there is provided a pair of hydraulic jacks 186 which are positioned on opposite sides of the forward part of the base frame 28a. After the reach 34a has been moved to its retracted position, the two jacks 186 are extended to lift the front wheels 32c off the ground, as shown in FIG. 18. Then, a hydraulic jack 188 is extended to rotate a lever 190 forwardly and upwardly about an upper pivot connection 192. The lower end 194 of the lever 190 engages the rear end of the reach 34c to hold it securely in its raised position. Thereafter, the lifting jacks 186 can be retracted, with the lever 190 holding the reach 34c in the position shown in FIG. 18.

Figure 19:
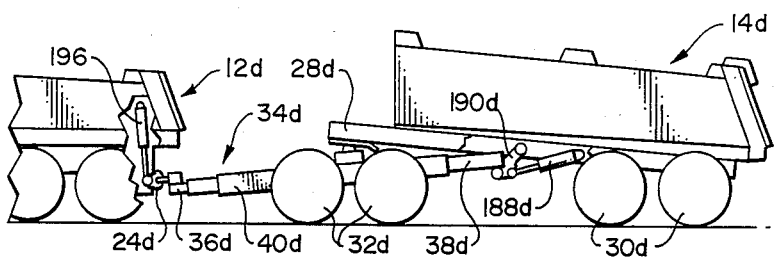
FIGS. 19 and 20 are views similar to FIGS. 15 and 16, respectively, showing yet a third embodiment of the present invention.
Figure 20:
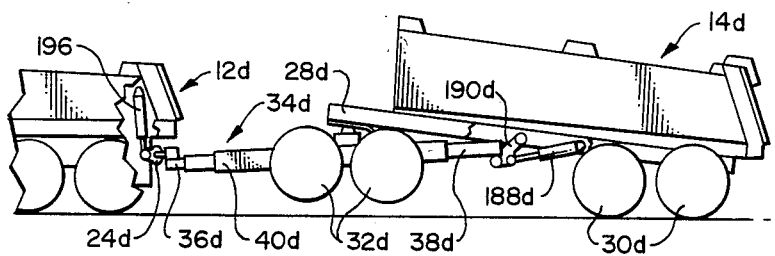

A third embodiment of the present invention is illustrated in FIGS. 19 and 20. In this embodiment, there is a securing device similar to the modification shown in FIGS. 17 and 18, and this comprises a hydraulic jack 188c and a securing lever 190d. The front end of the reach 34d is connected to a hitch at 24d, and this hitch 24d is in turn connected to a hydraulic jack 196 connected to the rear end of the truck 12d. In the operation of this third embodiment. when the reach 34d is moved to its fully retracted position as shown in FIG. 19, the hydraulic cylinder 188c is extended to place the securing lever 190d in its securing position holding the rear end of the reach 34d in place. Then, the hydraulic cylinder 196 is retracted, as shown in FIG. 20, to raise the front wheels 32d off the ground.

Figure 21:
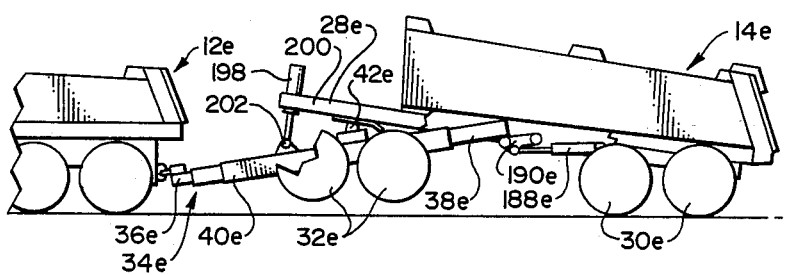
FIG. 21 is a view similar to FIG. 20, showing a fourth embodiment of the present invention.

In FIG. 21, there is shown a fourth embodiment of the present invention. In this arrangement, there is a securing means comprising the hydraulic jack 188e and securing lever 190e. However, to lift the front wheels 32e from the ground, there is provided a jack 198, the cylinder of which is mounted to a forward extension 200 of the main frame 28e. The piston rod of the jack 198 bears at 202 against the reach 34e at a location forwardly of the pivot connection 42e. In FIG. 21, this fourth embodiment is shown in its maneuvering mode, with the forward trailer wheels 32e lifted from the ground. The force couple is exerted so that, to lift the front wheels 32e from the ground, the hydraulic jack 198 exerts a downward force against the reach 34e at the location 202, while the pivot connection 42e exerts an upward force on the reach 34e. Once the wheels 32e are raised from the ground, and the securing lever 190e moved into place, the force exerted by the hydraulic jack 198 can be decreased so that the holding lever 190e holds the reach 34e in place. In this condition, the force couple is exerted in substantially the same manner as indicated previously, with the securing lever 190e exerting an upward force, and the pivot connection at 42e pressing downwardly onto the reach 34e.

Figure 22:
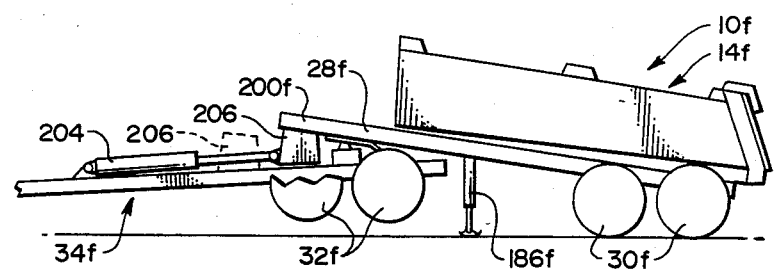
FIG. 22 is a view similar to FIG. 21, showing a fifth embodiment of the present invention.

A fifth embodiment is illustrated in FIG. 22. In this fifth embodiment, there is a hydraulic jack 186f (or a pair of hydraulic jacks 186f) to raise the forward end of the trailer 14f. With the trailer 14f in its raised position, so that the forward wheels 32f are off the ground, a hydraulic jack 204 moves a block 206 rearwardly so that it becomes wedged between a forward extension 200f of the base frame 28f and the upper surface or the reach 34f. The block 206 is shown in its retracted position in broken lines. After the block 206 is in the position shown in solid lines in FIG. 22, the jack or jacks 186f can be retracted to complete the placing of the assembly 10f in its maneuvering mode. In this fifth embodiment, the truck and the telescoping sections of the reach are not shown, mainly for convenience of illustration.

Figure 23:
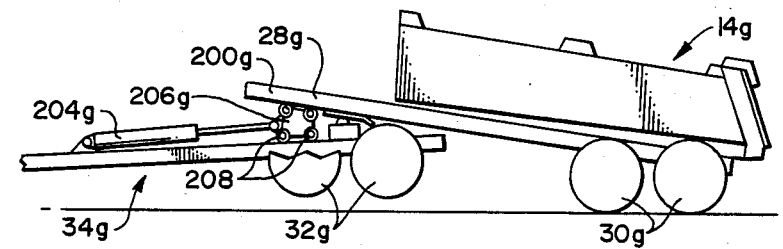
FIG. 23 is a view similar to FIG. 22, showing a modification of the fifth embodiment shown in FIG. 22.

A modification of the fifth embodiment of FIG. 22 is shown in FIG. 23. In this embodiment, the hydraulic jack 204g moves the block 206g into wedging engagement between the upper surface of the reach 34g and the forward extension 200g of the base frame 28g. The wedging block 206g is provided with suitable rollers 208 or other low friction devices to enhance the effectiveness of the wedging action. By extending the hydraulic jack 204g, the block 206g is forced into engagement to rotate the reach 34g to lift the front trailer wheels 32g from the ground.

Figure 24:
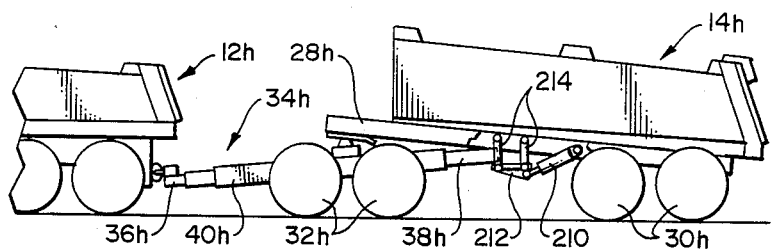
FIGS. 24 and 25 are views similar to FIGS. 15 and 16, respectively, showing a sixth embodiment of the present invention.
Figure 25:
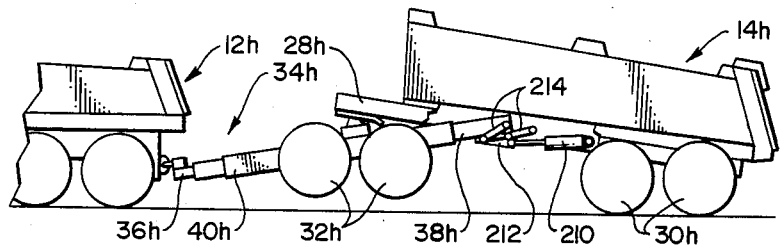

A sixth embodiment is shown in FIGS. 24 and 25. In this sixth embodiment, the reach 34h telescopes rearwardly as in the previous embodiments. To rotate the rear end of the reach 34h upwardly and secure it in the configuration of FIG. 25, there is provided a hydraulic jack 210 attached to the bottom of the trailer main frame 28h. This jack 210 swings a four bar linkage made up of a lower lifting bar 212 and two parallel bars 214. The bar 212 swings forwardly and upwardly to press against the rear end or the reach 34h and lift the forward wheels 32h from the ground.

Figure 26:
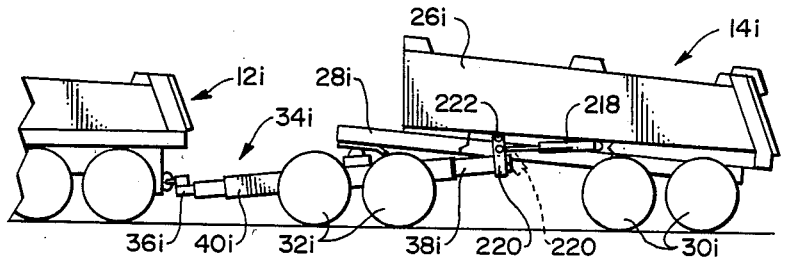
FIGS. 26 and 27 are views similar to FIGS. 15 and 16, respectively, showing a seventh embodiment of the present invention.
Figure 27:
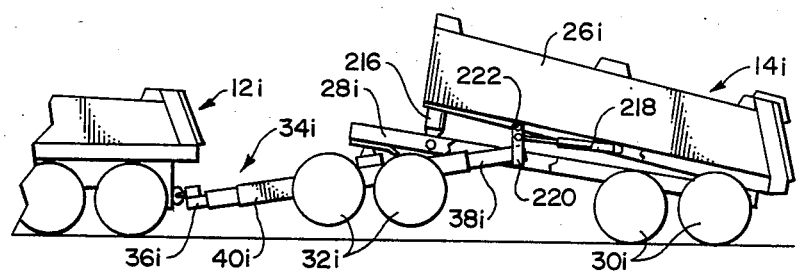

A seventh embodiment is illustrated in FIGS. 26 and 27. In this seventh embodiment, the reach 34i is retracted in telescoping fashion as in a number of the embodiments noted above. This embodiment differs from the preceeding embodiments in that the mechanism used to lift the front wheels 32i from the ground cooperate with the lifting mechanism or hydraulic jacks 216 that are provided in conventional dump trailers to raise the dump body 26i of the trailer 14i.

In this seventh embodiment, there is a hydraulic jack 218 which actuates a pivotally mounted harness 220. The harness 220 is pivotally connected at is upper end 222 to the bottom side ot the dump body 26i. In operation, the hydraulic jack 218 is initially retracted so that the harness 220 is in the broken line position of FIG. 26. Then the jack 218 is extended to swing the harness 220 downwardly to the full line position of FIG. 26. Then, the hydraulic jack 224 which is connected between the base frame 28i and the dump body 26i is extended to begin lifting the dump body 26i off the base frame 28i. The lifting of the dump body 26i raises the harness 220 relative to the base frame 28i, thus causing relative rotational movement between the reach 34i and the base frame 28i. This has the effect of lifting the front trailer wheels 32i off the ground.

With the trailer 14i in the position shown in FIG. 27, the trailer 14i is in its maneuvering mode of operation and can be backed up to the desired unloading location. When it is at the unloading location, the dump body lifting jack 224 is retracted to lower the front trailer wheels 32i to the ground engaging location, and the harness 220 is moved out of engagement with the rear end of the reach 34i by retracting the cylinder 226. Then the lifting jacks 216 can again be extended to its full up position to fully rotate the dump body 26i so as to unload the dump body 26i.

Subsequent to this, the locking devices of the reach 34i can be released so that the reach 34i can be extended to its full length position, as described previously herein.

Figure 28:
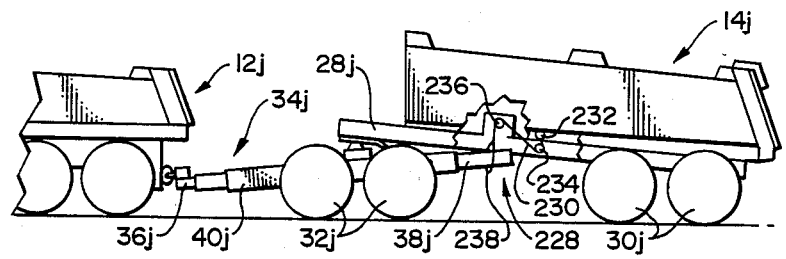
FIGS. 28 and 29 are views similar to FIGS. 26 and 27, respectively, showing a modification of the seventh embodiment shown in FIGS. 26 and 27.
Figure 29:
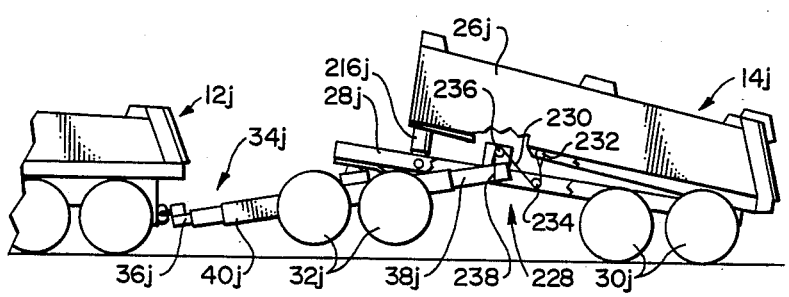

In FIGS. 28 and 29, there is shown a modification of the seventh embodiment illustrated in FIGS. 26 and 27. This embodiment still utilizes the existing hydraulic jacks 26j that are normally used to raise the pump body 26j. However, the attachment between the rear end of the reach 34j and the dump body 26j is accomplished by means of a pulley assembly 228. More specifically, this pulley assembly 228 comprises a cord or cable 230 attached at one end to the trailer dump body 26j at a location indicated at 232. This cord 230 extends around a pulley 234 attached to the trailer base frame 28j, and thence around a pulley 236 attached to the dump body 26j. The opposite end of the cable 230 is formed in a harness 238 which engages the rear end of the reach 34j. When the jacks 216j are extended to lift the dump body 26j relative to the base frame 28j, the front trailer wheels 32j are lifted from the ground in the same manner as the seventh embodiment in FIGS. 26 and 27. The manner of moving the trailer 14j to the unloading location and accomplishing the unloading is done in the same manner as described above with reference to the seventh embodiment of FIGS. 26 and 27.

It is to be understood that the above description is intended to disclose various possible arrangements for accomplishing the functions of the present invention, and it is not intended that the present invention be limited to any one of these specific embodiments. Further, while the invention is shown as applied to dump trailers and dump trucks, it is to be understood that it could be applied to other trailers or truck and trailer combinations or tractor and trailer combinations where similar problems exist.

I claim:

1. A trailer adapted to be connected to a towing vehicle having a hitch, in a manner to have a travel configuration where the trailer is adapted to travel over routes where there are limitations as to the weight which can be carried by ground engaging wheels of the vehicle, and a maneuvering configuration where the trailer is adapted to perform maneuvers, such as backup maneuvers, effectively, said trailer having a front end and a rear end, and comprising:

(a) a rear set of ground engaging wheels;
(b) a front set of steerable ground engaging wheels;
(c) an adjustable reach having a front connecting portion adapted to engage a hitch of a rowing vehicle and a rear portion connected to said trailer, said reach having an extended position where the trailer is spaced further from a towing vehicle at a sufficient distance to meet route weight limitations when in its traveling configuration and a retracted position where the trailer is positioned more closely to the truck;
(d) a lifting and securing means operatively connected to the trailer to raise the forward set of wheels from a ground engaging position and to secure said reach in its retracted position to the trailer in a manner to resist downward rotation of the front end of the trailer relative to the reach so as to keep said front set of wheels out of ground engagement, thus placing the trailer in its maneuvering configuration; whereby said trailer in its travel configuration can carry relatively high loads, and said trailer can be arranged in its maneuvering configuration to accomplish more difficult maneuvers, such as backup maneuvers.

2. The trailer as recited in claim 1, wherein said reach is attached to the trailer at a trailer connecting location, said reach having a bearing portion at a bearing location spaced from the connecting location, said lifting and securing means comprising a lifting device to engage the reach at the bearing portion to rotate the reach relative to the trailer so that a force couple is applied at said bearing location and at said connecting location to raise the front wheels of the trailer.

3. The trailer as recited in claim 2, wherein said bearing portion is located on said reach rearwardly of said connecting location, and said lifting device comprises a wedging member to engage the bearing portion of the reach in wedging relationship so as to rotate the reach relative to the trailer.

4. The trailer as recited in claim 3, wherein said wedging member is movably mounted relative to said trailer, said trailer further requiring power means to move said wedging member into wedging engagement with the bearing portion.

5. The trailer as recited in claim 4 wherein said wedging member has wall means defining a rearwardly tapering recess to receive a bearing portion at a rear end of the reach, whereby, as said wedging member comes into wedging engagement with the reach, the reach becomes centered relative to said tapering recess, so as to properly locate the reach relative to the trailer.

6. The trailer as recited in claim 3, wherein said wedging member is positioned at a stationary location relative to said trailer, and said reach has a telescoping member movable rearwardly into wedging engagement with said wegging member, whereby rearward movement of said reach into wedging engagement raises the front set of trailer wheels out of ground engagement.

7. The trailer as recited in claim 2, wherein said lifting device comprises a generally horizontally aligned pivot arm having a pivot location spaced from the bearing location of the reach, said trailer further comprising power means to rotate said lever upwardly to apply an upward force to said bearing portion.

8. The trailer as recited in claim 2, wherein said lifting device comprises a lifting lever having a pivot location located vertically above said bearing portion with said reach in its retracted position, said trailer further comprising power means to rotate said lifting lever in a direction to swing a bearing portion of said lever upwardly in engagement with the bearing portion.

9. The trailer as recited in claim 2, wherein said trailer has a forward extension positioned forwardly of said connecting location, and the bearing portion of the reach is positioned forwardly of the connecting location, said trailer further comprising power means arranged to exert a force component of the force couple between the forward extension of the trailer and the bearing portion on the reach so as to lift the front trailer wheels.

10. The trailer as recited in claim 9, wherein said lifting and securing means further comprises a securing device positioned to engage said reach at a location rearwardly of the connecting location and hold the reach in place relative to the trailer, after the power means has raised the front trailer wheels from a ground engaging location.

11. The trailer as recited in claim 9, wherein said power means comprises wedging means to engage said forward extension and said bearing portion in wedging relationship so as to move said forward extension and said bearing portion away from one another so as to lift the front trailer wheels from a ground engaging location.

12. The trailer as recited in claim 9, wherein said power means comprises an extendable power member adapted to engage said forward extension and said bearing portion to apply an extending force thereto.

13. The trailer as recited in claim 2, wherein said trailer has a base frame and a body portion vertically movable relative to said base frame, said lifting device being arranged to be operatively connected between said reach bearing portion and said trailer body, said trailer further having a body raising means which, if raising said trailer body, rotates said reach relative to the trailer base frame to raise the front wheels from the ground.

14. The trailer as recited in claim 13, wherein said lifting device comprises a harness operatively connected between said trailer body and said reach.

15. The trailer as recited in claim 13, wherein said lifting device comprises cord and pulley means operatively connected between said trailer body and said reach.

16. The trailer as recited in claim 1, wherein said lifting and securing means comprises a lifting device adapted to be operatively connected to said trailer and adapted to engage a ground surface so as to raise the trailer front wheels from a ground engaging location, and a securing device adapted to secure said reach to the trailer so as to prevent said front trailer wheels from returning to the ground.

17. The trailer as recited in claim 16, wherein said reach is attached to the trailer at a trailer connecting location, said reach having a rear reach portion extending rearwardly of said connecting location, said securing means engaging said reach to hold said reach in place at a location rearwardly of said connecting location.

18. The trailer as recited in claim 16, wherein said securing means is operatively positioned to engage said reach and said trailer at a location forwardly of said connecting location to prevent downward rotation of said trailer and thus prevent the front wheels from engaging the ground.

19. The trailer as recited in claim 16, wherein said reach has a plurality of telescoping sections comprising a forward telescoping section connecting to said truck, and a rear telescoping section connecting to said trailer, said reach having locking means to secure said reach in its extended and retracted positions.

20. The trailer as recited in claim 16, wherein said reach has a plurality of telescoping sections, including a rear telescoping section connecting to said trailer, said reach further comprising a forward telescoping section adapted to telescope rearwardly in said rear telescoping section to extend rearwardly from said rear telescoping section, said lifting and securing means comprising a lifting device arranged to engage a rear portion of the forward section of the reach to rotate the reach relative to the trailer to raise the front wheels of the trailer.

21. The trailer as recited in claim 20, wherein said reach comprises at least three telescoping sections, said first and second telescoping sections having a cross-sectional configuration comprising an upper wall means having a sloped configuration, whereby debris falling on said reach would not remain deposited on said reach.

22. The trailer as recited in claim 20, wherein said lifting member comprises a wedging member to engage the rear end of the front reach in its retracted position in wedging relationship so as to rotate the reach relative to the trailer.

23. The trailer as recited in claim 20, wherein said trailer has a base frame and a body portion vertically movable relative to the base frame, said lifting device being arranged to be operatively connected between the rear and of the forward reach section and said body portion, said trailer further having a body raising means, which, in raising said trailer body, rotates said reach relative to the trailer base frame to raise the front wheels from the ground.

24. The trailer as recited in claim 1, wherein said trailer is a dump trailer having a base frame and a dump body pivotally mounted at a rear end of dump body to said base frame, said trailer further having dump body lifting means to raise the dump body between its lower position and an upper dump position, said reach being attached to the base frame at a trailer connecting location, said reach having a bearing portion at a bearing location spaced rearwardly from the connecting location, said lifting and securing means comprising a lifting device to interconnect the bearing portion of the reach to the dump body at a location rearwardly of the pivot connection of the dump body whereby raising of the dump body raises the bearing portion relative to the base frame so as to lift the front wheels from the ground.

25. The trailer as recited in claim 24, wherein said connecting device has an operative connection to a moving member to move the connecting device into and out of engagement with said reach.

26. A method of operating a truck and trailer method in a travel mode to travel over routes where there are limitations as to the weight which can be carried by ground engaging wheels of the mernod, and in a maneuvering mode to perform maneuvers, such as backup maneuvers, effectively, wherein said method comprises:
(a) a truck having a trailer hitch adapted to carry not only horizontal force loads, but also vertically applied force loads;
(b) a trailer having a front end and a rear end, said trailer comprising:
(1) a rear set of ground engaging wheels;
(2) a front set of steerable ground engaging wheels;
(3) an adjustable reach having a front connecting portion adapted to engage said hitch and a rear portion connected to said trailer, said reach having an extended position where the trailer is spaced further from the truck at a sufficient distance to meet route weight limitations when in its traveling configuration and a retracted position where the tractor is positioned more closely to the truck;
(4) a lifting and securing means operatively connected to the trailer to raise the forward set of wheels from a ground engaging position and to secure said reach in its retracted position to the trailer in a manner to resist downward rotation of the front end of the trailer relative to the reach so as to keep said front set of wheels out of ground engagement, thus placing the method in its maneuvering configuration;
said method comprising:
(a) attaching said trailer to said truck and placing said reach in its extended position;
(b) moving said truck and trailer over a route in the traveling mode with the front trailer wheels engaging a ground surface and the reach extended,
(c) moving said truck and trailer to a maneuvering location and placing said truck and trailer in a maneuvering mode by placing said reach in its retracted position and operating the lifting and securing means to lift the front trailer wheels from the ground surface.

27. The method as recited in claim 26, wherein said reach is attached to the trailer at a trailer connecting location, said reach having a bearing portion at a bearing location spaced from the connecting location, said lifting and securing means comprising a lifting device, said method comprising engaging the reach at the bearing portion to rotate the reach relative to the trailer so that a force couple is applied at said bearing location and at said connecting location to raise the front wheels of the trailer.

28. The method as recited in claim 27, wherein said bearing portion is located on said reach rearwardly of said connecting location, and said lifting device comprises a wedging member, said method comprising engaging the bearing portion of the reach in wedging relationship so as to rotate the reach relative to the trailer.

29. The method as recited in claim 28, wherein said wedging member is movably mounted relative to said trailer, said method further comprising moving said wedging member into wedging engagement with the bearing portion.

30. The method as recited in claim 29, wherein said wedging member has wall means defining a rearwardly tapering recess to receive a bearing portion at a rear end of the reach, said method comprising moving said wedging member into wedging engagement with the reach, so that the reach becomes centered relative to said tapering recess, so as to properly locate the reach relative to the trailer.

31. The method as recited in claim 28, wherein said wedging member is positioned at a stationary location relative to said trailer, and said reach has a telescoping member movable rearwardly into wedging engagement with said wedging member, said method of said reach into wedging engagement raises the front set of trailer wheels out of ground engagement.

32. The method as recited in claim 27, wherein said lifting device comprises a generally horizontally aligned pivot arm having a pivot location spaced from the bearing location of the reach, said method further comprising rotating said lever upwardly to apply an upward force to said bearing portion.

33. The method as recited in claim 27, wherein said lifting device comprises a lifting lever having a pivot location located vertically above said bearing portion with said reach in its retracted position, said method further comprising rotating said lifting lever in a direction to swing a bearing portion of said lever upwardly in engagement with the bearing portion.

34. The method as recited in claim 27, wherein said trailer has a base frame and a body portion vertically movable by a body raising means relative to said base frame, said lifting device being arranged to be operatively connected between said reach bearing portion and said trailer body, said method further comprising operating the body raising means to raise said trailer body to rotate said reach relative to the trailer base frame to raise the front wheels from the ground.

35. The method as recited in claim 34, wherein said lifting device comprises a harness operatively connected between said trailer body and said reach.

36. The method as recited in claim 26, further comprising utilizing a lifting device operatively positioned between said trailer and a ground surface to raise the trailer front wheels from a ground engaging location, and then securing said reach to the trailer so as to prevent said front trailer wheels from returning to the ground.

37. The method as recited in claim 26, wherein said trailer is a dump trailer having a base frame and a dump body pivotally mounted at a rear end of said dump body to said base frame, said trailer further having dump body lifting means to raise the dump body between its lower position and an upper dump position, said reach being attached to the base frame at a trailer connecting location, said reach having a bearing portion at a bearing location spaced rearwardly from the connecting location, said method comprising interconnecting the bearing portion of the reach to the dump body at a location rearwardly of the pivot connection of the dump body and raising of the dump body to raise the bearing portion relative to the base frame so as to lift the front wheels from the ground.

* * * * *